(12) United States Patent
Katori

(10) Patent No.: US 11,651,788 B2
(45) Date of Patent: May 16, 2023

(54) SPINEL FERRITE MAGNETIC POWDER AND METHOD FOR MANUFACTURING THE SAME

(71) Applicant: Sony Corporation, Tokyo (JP)

(72) Inventor: Kenji Katori, Kanagawa (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 16/759,043

(22) PCT Filed: Oct. 1, 2018

(86) PCT No.: PCT/JP2018/036684
§ 371 (c)(1),
(2) Date: Apr. 24, 2020

(87) PCT Pub. No.: WO2019/082604
PCT Pub. Date: May 2, 2019

(65) Prior Publication Data
US 2020/0286514 A1    Sep. 10, 2020

(30) Foreign Application Priority Data
Oct. 25, 2017   (JP) .............................. JP2017-205762

(51) Int. Cl.
*G11B 5/706* (2006.01)
*H01F 1/11* (2006.01)
*C01G 49/00* (2006.01)
*H01F 1/36* (2006.01)

(52) U.S. Cl.
CPC ........ *G11B 5/70678* (2013.01); *C01G 49/009* (2013.01); *H01F 1/11* (2013.01); *H01F 1/36* (2013.01)

(58) Field of Classification Search
CPC ................................ H01F 1/36; C01G 49/009
See application file for complete search history.

(56) References Cited

U.S. PATENT DOCUMENTS

| | | | |
|---|---|---|---|
| 5,527,603 A | 6/1996 | Isobe et al. | |
| 2016/0372145 A1* | 12/2016 | Maeshima | ............... G11B 5/84 |

FOREIGN PATENT DOCUMENTS

| | | |
|---|---|---|
| JP | S6121921 A | 1/1986 |
| JP | S6181608 A | 4/1986 |
| JP | S6218006 A | 1/1987 |
| JP | 2003123227 A | 4/2003 |
| JP | 2012156437 A | 8/2012 |
| WO | 2017138532 A1 | 8/2017 |

OTHER PUBLICATIONS

International Search Report for Application No. PCT/JP2018/036684, dated Oct. 30, 2018.

* cited by examiner

*Primary Examiner* — C Melissa Koslow
(74) *Attorney, Agent, or Firm* — K&L Gates LLP

(57) ABSTRACT

To provide a spinel ferrite magnetic powder having excellent characteristics.
A method for manufacturing a magnetic powder includes: melting and then quenching a glass-forming component and a spinel ferrite magnetic powder-forming component to manufacture an amorphous body; and heat-treating the amorphous body to precipitate a spinel ferrite magnetic powder. An oxygen partial pressure during the heat treatment is 1.0 kPa or less.

12 Claims, 1 Drawing Sheet

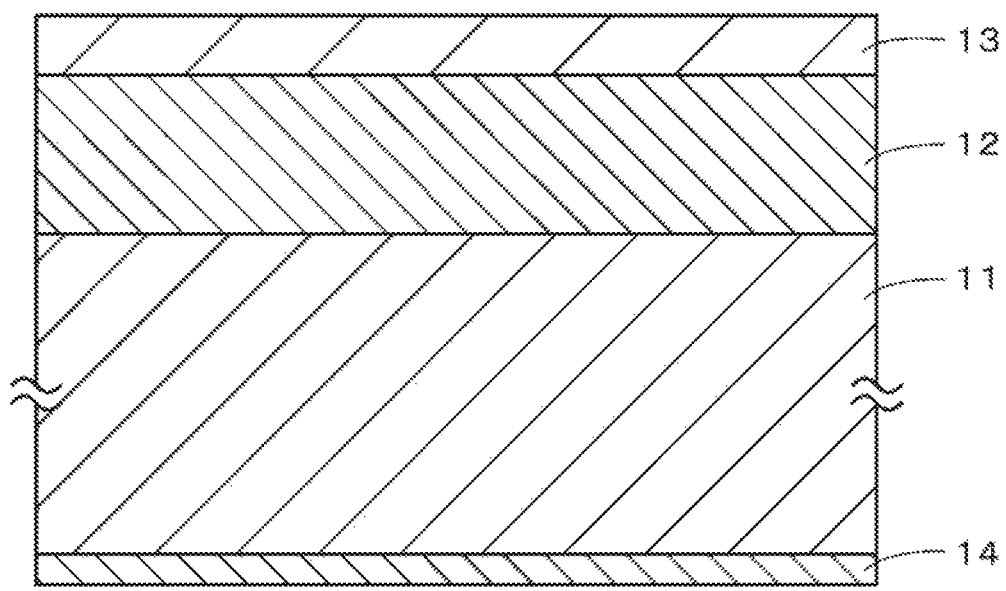

SPINEL FERRITE MAGNETIC POWDER AND METHOD FOR MANUFACTURING THE SAME

TECHNICAL FIELD

The present disclosure relates to a spinel ferrite magnetic powder and a method for manufacturing the same.

BACKGROUND ART

An application type magnetic recording medium is widely used for storing electronic data. In order to achieve a high recording density, various types of magnetic powders for an application type magnetic recording medium have been studied. Among these magnetic powders, a spinel ferrite magnetic powder is one of magnetic powders that are most expected to be applied to a next-generation high density magnetic recording medium.

For example, Patent Document 1 describes a single crystal cobalt ferrite fine particle powder having an average crystal size of 20 to 50 nm and a coercive force of 158 kA/m or more at room temperature. Furthermore, Patent Document 1 also describes a method for manufacturing a single crystal cobalt ferrite fine particle powder by a coprecipitation method for manufacturing a cobalt ferrite fine particle powder by mixing an aqueous solution containing $Fe^{3+}$ ions and $Co^{2+}$ ions as metal ions and a strong alkaline aqueous solution.

CITATION LIST

Patent Document

Patent Document 1: Japanese Patent Application Laid-Open No. 2003-277189

SUMMARY OF THE INVENTION

Problems to be Solved by the Invention

In the technical field of a magnetic recording medium and the like, it is desired to improve characteristics of a spinel ferrite magnetic powder.

An object of the present disclosure is to provide a spinel ferrite magnetic powder having excellent characteristics and a method for manufacturing the same.

Solutions to Problems

In order to solve the above problems, a first disclosure is a method for manufacturing a magnetic powder, including: melting and then quenching a glass-forming component and a spinel ferrite magnetic powder-forming component to manufacture an amorphous body; and heat-treating the amorphous body to precipitate a spinel ferrite magnetic powder, in which an oxygen partial pressure during the heat treatment is 1.0 kPa or less.

A second disclosure is a spinel ferrite magnetic powder having uniaxial anisotropy, an average particle size of 25 nm or less, and a coercive force Hc of 2500 Oe or more.

A third disclosure is a magnetic powder manufacturing method for manufacturing a spinel ferrite magnetic powder by a glass crystallization method using a glass-forming component containing sodium borate and a spinel ferrite magnetic powder-forming component.

Effects of the Invention

According to the present disclosure, a spinel ferrite magnetic powder having excellent characteristics can be obtained. Note that the effects described here are not necessarily limited, and may be any of the effects described in the present disclosure or may be different therefrom.

BRIEF DESCRIPTION OF DRAWINGS

FIG. 1 is a cross-sectional view illustrating a configuration of a magnetic recording medium according to a second embodiment of the present disclosure.

MODE FOR CARRYING OUT THE INVENTION

Embodiments of the present disclosure will be described in the following order.
1 First Embodiment (Example of Magnetic Powder and Method for Manufacturing the Same)
2 Second Embodiment (Example of Magnetic Recording Medium and Method for Manufacturing the Same)

1 First Embodiment

[Magnetic Powder]
First, a magnetic powder according to a first embodiment of the present disclosure will be described. The magnetic powder is a so-called spinel ferrite magnetic powder, and suitable for a recording layer of an application type high density magnetic recording medium. Here, the high density magnetic recording medium can record a signal at a shortest recording wavelength of preferably 50 nm or less, more preferably 46 nm or less. The magnetic powder has uniaxial anisotropy. Since the magnetic powder has uniaxial anisotropy, a good signal-noise ratio (S/N) can be obtained in a case where the magnetic powder is applied to a magnetic recording medium. The magnetic powder can be synthesized by, for example, a glass crystallization method.

The magnetic powder has an average particle size of 25 nm or less, more preferably 23 nm or less. In a magnetic recording medium, an area having a half size of a recording wavelength is an actual magnetization area. Therefore, by setting the average particle size of the magnetic powder to a half or less of a shortest recording wavelength, a good S/N can be obtained. In a case where the average particle size of the magnetic powder is 25 nm or less, a good S/N can be obtained in a magnetic recording medium that can record a signal at a shortest recording wavelength of 50 nm or less.

The above average particle size of the magnetic powder is determined as follows. First, the magnetic powder is imaged using a transmission electron microscope (TEM). Next, 500 magnetic particles are randomly selected from the imaged TEM photograph, the maximum particle size of each of the particles is measured, and a particle size distribution of the maximum particle size of the magnetic powder is determined. Here, the "maximum particle size" means a so-called maximum Feret diameter, and specifically means the largest distance among distances between two parallel lines drawn from all angles so as to come into contact with an outline of each of the magnetic particles. Thereafter, a median diameter (50% diameter, D50) of the maximum particle size is determined from the determined particle size distribution of the maximum particle size to be used as an average particle size (average maximum particle size) of the particles.

The coercive force Hc of the magnetic powder is 2500 Oe or more, and preferably 2600 Oe or more and 3500 Oe or less. When the coercive force Hc is less than 2500 Oe, in a case where the magnetic powder is applied to a magnetic recording medium, it is difficult to strictly hold a recording area, and there is a possibility that a good S/N cannot be obtained. Meanwhile, when the coercive force Hc exceeds 3500 Oe, saturation recording by a recording head is difficult, and there is a possibility that a good signal-noise ratio (SNR) cannot be obtained.

The above coercive force Hc of the magnetic powder is determined as follows using a vibrating sample magnetometer (VSM) or a superconducting quantum interference device (SQUID). First, a magnetic powder sample having a predetermined shape is manufactured. The magnetic powder sample can be freely manufactured within a range that does not affect measurement, such as compaction to a measurement capsule or bonding to a measurement tape. Next, an M-H loop of the magnetic powder sample is obtained, and then the coercive force Hc is determined from the obtained M-H loop. Note that measurement of the above M-H loop is performed at 25° C.

The magnetic powder contains iron oxide magnetic particles having spinel ferrite as a main phase (hereinafter referred to as "spinel ferrite magnetic particles"). The spinel ferrite magnetic particles each have, for example, a cubic shape or a substantially cubic shape. The spinel ferrite is a cobalt ferrite containing Co. The cobalt ferrite may further contain one or more selected from the group consisting of Ni, Mn, Al, Cu, and Zn in addition to Co.

The cobalt ferrite has, for example, an average composition represented by the following formula (1).

$$Co_xM_yFe_2O_z \quad (1)$$

(Provided that in formula (1), M represents, for example, one or more metals selected from the group consisting of Ni, Mn, Al, Cu, and Zn. x represents a value within a range of $0.4 \leq x \leq 1.0$. y represents a value within a range of $0 \leq y \leq 0.3$. Provided that x and y satisfy a relationship of $(x+y) \leq 1.0$. z represents a value within a range of $3 \leq z \leq 4$. Some of Fe may be replaced with another metal element.)

[Method for Manufacturing Magnetic Powder]

Next, a method for manufacturing a magnetic powder according to the first embodiment of the present disclosure will be described. This method for manufacturing a magnetic powder manufactures a spinel ferrite magnetic powder by a glass crystallization method using a glass-forming component and a spinel ferrite magnetic powder-forming component (hereinafter simply referred to as "magnetic powder-forming component").

(Step of Mixing Raw Materials)

First, a glass-forming component and a magnetic powder-forming component are mixed to obtain a mixture.

The glass-forming component contains sodium borate ($Na_2B_4O_7$). By inclusion of sodium borate in the glass-forming component, the magnetic powder-forming component can be dissolved in glass in a melting and amorphization step described later. Furthermore, quenching conditions for vitrification in the melting and amorphization step described later are alleviated. As a result, an amorphous body can be obtained not by quenching a melt with a twin roll quenching device but also by pouring the melt into water to quench the melt. Moreover, in a magnetic powder taking-out step described later, crystallized glass (nonmagnetic component) can be removed with hot water and the like, and a magnetic powder can be taken out.

The ratio of sodium borate to the total amount of the glass-forming component and the magnetic powder-forming component is preferably 35 mol % or more and 60 mol % or less. When the ratio of sodium borate is 35 mol % or more, an amorphous body with high homogeneity can be obtained. Meanwhile, when the ratio of sodium borate is 60 mol % or less, a decrease in the amount of a magnetic powder obtained can be suppressed.

The glass-forming component preferably further contains at least one of an alkaline earth metal oxide and a precursor of the oxide. In a case where the glass-forming component further contains at least one of an alkaline earth metal oxide and a precursor of the oxide, the glass softening point of glass can be raised, and the magnetic powder-forming component can be crystallized near the glass softening point. Therefore, it is possible to suppress softening of glass when a temperature at which the magnetic powder-forming component is crystallized is reached, and sintering of the precipitated magnetic powder.

The alkaline earth metal oxide contains, for example, at least one of calcium oxide (CaO), strontium oxide (SrO), and barium oxide (BaO). Among these oxides, the alkaline earth metal oxide particularly preferably contains at least one of strontium oxide and barium oxide. This is because the effect of raising the glass softening point by strontium oxide and barium oxide is higher than the effect of raising the glass softening point by calcium oxide. Note that in a case where calcium oxide is used as the alkaline earth metal oxide, it is preferable to use calcium oxide in combination with at least one of strontium oxide and barium oxide from a viewpoint of raising the glass softening point.

The precursor of the alkaline earth metal oxide is preferably a substance that generates an alkaline earth metal oxide by heating at the time of melting in the melting and amorphization step described later. Examples of such a substance include an alkaline earth metal carbonate, but are not particularly limited thereto. The alkaline earth metal carbonate contains, for example, at least one of calcium carbonate ($CaCO_3$), strontium carbonate ($SrCO_3$), and barium carbonate ($BaCO_3$). Among these oxides, the alkaline earth metal carbonate particularly preferably contains at least one of strontium carbonate and barium carbonate. The alkaline earth metal oxide is unstable because of combining with $CO_2$ or moisture in air. Therefore, use of a precursor of the alkaline earth metal oxide (for example, an alkaline earth metal carbonate) as the glass-forming component allows more accurate weighing than use of the alkaline earth metal oxide.

The molar ratio of the alkaline earth metal oxide to sodium borate (alkaline earth metal oxide/sodium borate) is preferably 0.25 or more and 0.5 or less. When the above molar ratio is less than 0.25, the glass softening point of glass is lowered, and there is a possibility that the glass is softened before sufficient crystallinity is imparted to the magnetic powder in a crystallization step described later. Therefore, there is a possibility that the precipitated magnetic powder sinters, and the particle size of the magnetic powder increases. Meanwhile, when the above molar ratio exceeds 0.5, the glass softening point of glass is too high, and a hexagonal ferrite magnetic powder precipitates together with the spinel ferrite magnetic powder, and there is a possibility that a variation in the coercive force Hc of the magnetic powder increases. Therefore, in a case where the magnetic powder is applied to a magnetic recording medium, there is a possibility that the S/N is lowered.

The magnetic powder-forming component contains at least one of cobalt oxide (CoO) and a precursor of cobalt oxide, and iron oxide ($Fe_2O_3$). The precursor of cobalt oxide is preferably a substance that generates cobalt oxide by heating at the time of melting in the melting and amorphization step described later. Examples of such a substance include cobalt carbonate ($CoCO_3$), but are not particularly limited thereto.

(Melting and Amorphization Step)

Next, the obtained mixture is heated and melted at a high temperature (for example, about 1400° C.) to obtain a melt, and then the melt is quenched to obtain an amorphous body (glass body). Here, even if a microcrystal is partially precipitated, there is no problem as long as the microcrystal does not become coarse during a subsequent heat treatment.

Examples of a method for quenching the melt include a liquid quenching method such as a metal twin roll method or a single roll method, and a method for pouring the melt into water. However, the method for pouring the melt into water is preferable from a viewpoint of simplification of manufacturing equipment.

(Crystallization Step)

Subsequently, the amorphous body is heat-treated to be crystallized by a heating device, and a spinel ferrite magnetic powder is thereby precipitated in the crystallized glass to obtain a magnetic powder-containing body. At this time, since the magnetic powder is precipitated in the crystallized glass (nonmagnetic component), it is possible to suppress mutual sintering of particles and to obtain a magnetic powder having a fine particle size. Furthermore, since the amorphous body is heat-treated at a high temperature, a magnetic powder with good crystallinity and high magnetization ($σs$) can be obtained.

The heat treatment is performed in an atmosphere having a lower oxygen concentration than the air atmosphere. By performing the heat treatment in such an atmosphere, the coercive force Hc of the magnetic powder can be improved, and uniaxial anisotropy can be imparted to the magnetic powder. The oxygen partial pressure during the heat treatment is 1.0 kPa or less, preferably 0.9 kPa or less, more preferably 0.5 kPa or less, and still more preferably 0.1 kPa or less. Note that the oxygen partial pressure in the air atmosphere is 21 kPa. When the oxygen partial pressure during the heat treatment is 1.0 kPa or less, the coercive force Hc of the magnetic powder can be 2500 Oe or more. In order to make the atmosphere during the heat treatment lower in oxygen concentration than the air atmosphere, an inert gas such as nitrogen or Ar gas may be introduced into a heating device including the amorphous body, or the inside of the heating device may be evacuated using a vacuum pump to a low pressure state.

The temperature of the heat treatment is preferably 500° C. or higher and 670° C. or lower, and more preferably 530° C. or higher and 650° C. or lower, for example, about 610° C. The time for the heat treatment is preferably 0.5 hours or more and 20 hours or less, and more preferably 1.0 hour or more and 10 hours or less.

The glass softening point of glass which is a nonmagnetic component is preferably close to the crystallization temperature of the magnetic powder-forming component. When the glass softening point is low and the glass softening point is far from the crystallization temperature, glass becomes soft when a temperature for crystallizing the magnetic powder-forming component is reached, the precipitated magnetic powder easily sinters, and there is a possibility that the size of the magnetic powder is large.

(Magnetic Powder Taking-Out Step)

Thereafter, the crystallized glass which is a nonmagnetic component is removed with, for example, a weak acid or warm water, and the magnetic powder is taken out. As a result, the target magnetic powder is obtained.

[Effect]

The magnetic powder according to the first embodiment is a spinel ferrite magnetic powder having uniaxial anisotropy, an average particle size of 25 nm or less, and a coercive force Hc of 2500 Oe or more. By using this spinel ferrite magnetic powder for a high density magnetic recording medium, a high density magnetic recording medium having good characteristics can be obtained.

In the method for manufacturing a magnetic powder according to the first embodiment, in the crystallization step, the amorphous body is heat-treated in an atmosphere having a lower oxygen concentration than the air atmosphere, and therefore a spinel ferrite magnetic powder having a high coercive force Hc can be obtained. More specifically, a spinel ferrite magnetic powder having a coercive force Hc of 2500 Oe or more can be obtained by a heat treatment in an atmosphere having an oxygen partial pressure of 1.0 kPa or less.

[Modification]

The glass-forming component may contain at least one of sodium borate and a precursor of sodium borate.

The magnetic powder-forming component may contain at least one of cobalt oxide and a precursor of cobalt oxide, and at least one of iron oxide and a precursor of iron oxide.

The method for manufacturing a magnetic powder may further include a step of a heat treatment in a magnetic field described below between the crystallization step and the magnetic powder taking-out step.

(Step of Heat Treatment in Magnetic Field)

The magnetic powder-containing body (amorphous body after the heat treatment) is heat-treated again in a magnetic field using an annealing device capable of applying a magnetic field. That is, the spinel ferrite magnetic powder is heat-treated again in a magnetic field in a state where there is an interposed substance (crystallized glass) between spinel ferrite magnetic powder particles. By the heat treatment in a magnetic field, anisotropy in the applied magnetic field direction is imparted to the precipitated spinel ferrite magnetic powder.

The heat treatment in a magnetic field is performed in an atmosphere having a lower oxygen concentration than the air atmosphere. The oxygen partial pressure during the heat treatment is preferably 1.0 kPa or less, more preferably 0.9 kPa or less, still more preferably 0.5 kPa or less, and particularly preferably 0.1 kPa or less. When the oxygen partial pressure during the heat treatment is 1.0 kPa or less, the coercive force Hc of the spinel ferrite magnetic powder can be 2500 Oe or more. In order to make the atmosphere during the heat treatment lower in oxygen concentration than the air atmosphere, an inert gas such as nitrogen or Ar gas may be introduced into an annealing device including the magnetic powder-containing body after the heat treatment, or the inside of the annealing device may be evacuated using a vacuum pump to a low pressure state.

The temperature of the heat treatment in a magnetic field is preferably 300° C. or higher and 600° C. or lower, and more preferably 350° C. or higher and 550° C. or lower. The time for the heat treatment in a magnetic field is preferably one hour or more and ten hours or less, and more preferably two hours or more and five hours or less.

2 Second Embodiment

[Configuration of Magnetic Recording Medium]

A magnetic recording medium according to a second embodiment of the present disclosure is a so-called application type high density magnetic recording medium, and includes, as illustrated in FIG. 1, a long substrate 11, a base layer (nonmagnetic layer) 12 disposed on one main surface of the substrate 11, and a recording layer (magnetic layer) 13 disposed on the base layer 12. The magnetic recording medium may further include a protective layer (not illustrated), a lubricant layer (not illustrated), and the like disposed on the recording layer 13 as necessary. Furthermore, the magnetic recording medium may further include a back coat layer 14 disposed on the other main surface of the substrate 11 as necessary. The magnetic recording medium is long and travels in a longitudinal direction thereof during recording/reproduction.

The magnetic recording medium according to the second embodiment is suitable for a library device which is preferably a large-scale magnetic tape data archive device. Furthermore, the magnetic recording medium according to the second embodiment can record a signal at a shortest recording wavelength of preferably 50 nm or less, more preferably 46 nm or less.

(Substrate)

The substrate 11 serving as a support is a flexible, long, and nonmagnetic substrate. The nonmagnetic substrate is a film, and the film has a thickness of, for example, 3 μm or more and 8 μm or less. Examples of a material of the substrate 11 include a polyester such as polyethylene terephthalate, a polyolefin such as polyethylene or polypropylene, a cellulose derivative such as cellulose triacetate, cellulose diacetate, or cellulose butyrate, a vinyl-based resin such as polyvinyl chloride or polyvinylidene chloride, a plastic such as polycarbonate, polyimide, or polyamideimide, a light metal such as an aluminum alloy or a titanium alloy, a ceramic such as alumina glass, and the like.

(Recording Layer)

The recording layer 13 is a so-called perpendicular recording layer, and includes, for example, a magnetic powder, a binder, and conductive particles. The recording layer 13 may further include an additive such as a lubricant, an abrasive, or a rust inhibitor as necessary.

The magnetic powder is the magnetic powder according to the first embodiment.

As the binder, a resin having a structure in which a crosslinking reaction is imparted to a polyurethane-based resin, a vinyl chloride-based resin, or the like is preferable. However, the binder is not limited to these resins, and other resins may be blended appropriately according to physical properties and the like required for the magnetic recording medium. Usually, a resin to be blended is not particularly limited as long as being generally used in an application type magnetic recording medium.

Examples of the resin to be blended include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, a synthetic rubber, and the like.

Furthermore, examples of a thermosetting resin or a reactive resin include a phenol resin, an epoxy resin, a urea resin, a melamine resin, an alkyd resin, a silicone resin, a polyamine resin, a urea formaldehyde resin, and the like.

Furthermore, in order to improve dispersibility of the magnetic powder, a polar functional group such as $-SO_3M$, $-OSO_3M$, $-COOM$, or $P=O(OM)_2$ may be introduced into each of the above-described binders. Here, in the formulae, M represents a hydrogen atom or an alkali metal such as lithium, potassium, or sodium.

Moreover, examples of the polar functional group include a side chain type group having a terminal group of $-NR1R2$ or $-NR1R2R3^+X^-$, and a main chain type group of $>NR1R2^+X^-$. Here, in the formulae, R1, R2, and R3 each represent a hydrogen atom or a hydrocarbon group, and $X^-$ represents an ion of a halogen element such as fluorine, chlorine, bromine, or iodine, or an inorganic or organic ion. Furthermore, examples of the polar functional group include $-OH$, $-SH$, $-CN$, an epoxy group, and the like.

As nonmagnetic reinforcing particles, the recording layer 13 may further contain aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Base Layer)

The base layer 12 is a nonmagnetic layer containing nonmagnetic powder and a binder as a main component. The base layer 12 may further contain at least one of additives such as conductive particles, a lubricant, a curing agent, and a rust inhibitor as necessary.

The nonmagnetic powder may be an inorganic substance or an organic substance. Furthermore, the nonmagnetic powder may be carbon black or the like. Examples of the inorganic substance include a metal, a metal oxide, a metal carbonate, a metal sulfate, a metal nitride, a metal carbide, a metal sulfide, and the like. Examples of the shape of the nonmagnetic powder include various shapes such as an acicular shape, a spherical shape, a cubic shape, and a plate shape, but are not limited thereto.

The binder is similar to that of the above-described recording layer 13.

[Method for Manufacturing Magnetic Recording Medium]

Next, an example of a method for manufacturing a magnetic recording medium having the above configuration will be described. First, by kneading and dispersing a nonmagnetic powder, a binder, and the like in a solvent, a base layer forming coating material is prepared. Next, by kneading and dispersing a magnetic powder, a binder, and the like in a solvent, a recording layer forming coating material is prepared. For preparing the recording layer forming coating material and the base layer forming coating material, for example, the following solvents, dispersing devices, and kneading devices can be used.

Examples of the solvent used for preparing the above-described coating material include a ketone-based solvent such as acetone, methyl ethyl ketone, methyl isobutyl ketone, or cyclohexanone, an alcohol-based solvent such as methanol, ethanol, or propanol, an ester-based solvent such as methyl acetate, ethyl acetate, butyl acetate, propyl acetate, ethyl lactate, or ethylene glycol acetate, an ether-based solvent such as diethylene glycol dimethyl ether, 2-ethoxyethanol, tetrahydrofuran, or dioxane, an aromatic hydrocarbon-based solvent such as benzene, toluene, or xylene, a halogenated hydrocarbon-based solvent such as methylene chloride, ethylene chloride, carbon tetrachloride, chloroform, or chlorobenzene, and the like. These solvents may be used singly, or may be used in a mixture thereof appropriately.

Examples of a kneading device used for preparing the above-described coating material include a continuous twin-screw kneading machine, a continuous twin-screw kneading machine capable of performing dilution in multiple stages, a kneader, a pressure kneader, a roll kneader, and the like, but are not particularly limited to these devices. Furthermore, examples of a dispersing device used for preparing the above-described coating material include a roll mill, a ball mill, a horizontal sand mill, a vertical sand mill, a spike mill, a pin mill, a tower mill, a pearl mill (for example, "DCP mill" manufactured by Eirich Co., Ltd., or the like), a homogenizer, an ultrasonic wave dispersing machine, and the like, but are not particularly limited to these devices.

Next, a base layer forming coating material is applied to one main surface of the substrate 11 and dried to form the base layer 12. Subsequently, by applying a recording layer forming coating material onto the base layer 12 and drying the recording layer forming coating material, the recording layer 13 is formed on the base layer 12. Note that during drying, a magnetic powder is subjected to magnetic field orientation in a thickness direction of the substrate 11 by, for example, a solenoid coil. After the formation of the recording layer 13, a protective layer and a lubricant layer may be formed on the recording layer 13 as necessary, or the back coat layer 14 may be formed on the other main surface of the substrate 11.

Thereafter, the substrate 11 on which the base layer 12 and the recording layer 13 are formed is rewound around a large-diameter core and cured. Finally, the substrate 11 on which the base layer 12 and the recording layer 13 are formed is calendered and then cut into a predetermined width. As a result, a target magnetic recording medium is obtained.

[Effect]

Since the magnetic recording medium according to the second embodiment of the present disclosure includes the recording layer 13 containing the magnetic powder according to the first embodiment, a high density magnetic recording medium having good characteristics is obtained.

EXAMPLES

Hereinafter, the present disclosure will be described specifically with Examples, but the present disclosure is not limited only to these Examples.

In the present Examples, the average particle size of a cobalt ferrite magnetic powder was determined by the method for calculating the average particle size of the magnetic powder described in the first embodiment described above.

The present Examples will be described in the following order.

i Example using sodium borate as glass-forming component ii Examples with different oxygen partial pressures during heat treatment in crystallization step Example Using Sodium Borate as Glass-Forming Component Example 1

(Step of Mixing Raw Materials)

First, sodium borate ($Na_2B_4O_7$) and strontium carbonate ($SrCO_3$) as glass-forming components, and iron oxide ($Fe_2O_3$) and cobalt carbonate ($CoCO_3$) as magnetic powder-forming components were prepared. Then, the prepared raw materials were mixed such that $Na_2B_4O_7$:$SrO$:$Fe_2O_3$:$CoO$ was 44:16:24:16 in a molar ratio to obtain a mixture.

(Melting and Amorphization Step)

Next, the obtained mixture was heated at 1400° C. for one hour to melt the mixture, thus obtaining a melt. Thereafter, the melt was poured into water to obtain an amorphous body (glass body). Note that during the heating described above, carbonic acid is removed from strontium carbonate to generate strontium oxide. Furthermore, carbonic acid is removed from cobalt carbonate to generate cobalt oxide.

(Crystallization Step)

Subsequently, the obtained amorphous body was heat-treated at 610° C. for 1.5 hours in an atmosphere having an oxygen partial pressure of 0.1 kPa and crystallized to precipitate a cobalt ferrite magnetic powder. As a result, a magnetic powder-containing body in which cobalt ferrite was precipitated in crystallized glass was obtained.

(Magnetic Powder Taking-Out Step)

Thereafter, the crystallized glass as a nonmagnetic component was removed with hot water, and the cobalt ferrite magnetic powder was taken out. Then, the average particle size of the taken-out cobalt ferrite magnetic powder was determined. As a result, the average particle size was 19 nm.

(Analysis by X-Ray Diffraction)

The cobalt ferrite magnetic powder obtained as described above was analyzed by X-ray diffraction. As a result, a peak of cobalt ferrite was confirmed, but a peak of hexagonal ferrite or a nonmagnetic component (crystallized glass) was not confirmed. As a result, it has been found that precipitation of a hexagonal ferrite magnetic powder can be suppressed in the crystallization step described above, and crystallized glass can be removed with hot water in the magnetic powder taking-out step described above.

Note that in a case where boron oxide ($B2O_3$) used in a general glass crystallization method was used instead of sodium borate, the melt could not be made amorphous by pouring the melt into water.

Furthermore, in a case where boron oxide was used, the melt could be made amorphous by quenching the melt by a twin roll method. However, in the magnetic powder taking-out step, it was impossible to separate only the magnetic powder with hot water. Meanwhile, in a case where sodium borate was used, as described above, it was possible to separate only the magnetic powder with hot water.

ii Examples with Different Oxygen Partial Pressures During Heat Treatment in Crystallization Step Examples 2-1 to 2-6

In the crystallization step, as illustrated in Table 1, a cobalt ferrite magnetic powder was obtained in a similar manner to Example 1 except that the oxygen partial pressure was changed for each sample within a range of 0.5 kPa to 21.0 kPa. Note that the oxygen partial pressure of 21.0 kPa is the oxygen partial pressure in the air atmosphere.

(Measurement of Coercive Force Hc)

M-H loops of the cobalt ferrite magnetic powders of Examples 1 and 2-1 to 2-6 obtained as described above were measured by VSM, and the coercive force Hc was determined from the measured M-H loops. Table 1 illustrates results thereof. Note that the measurement of the above M-H loops was performed in an environment at 25° C.

Table 1 illustrates a relationship between an oxygen partial pressure during the heat treatment in the crystallization step and the coercive force Hc of the cobalt ferrite magnetic powder.

TABLE 1

|  | Oxygen partial pressure during heating crystallization at 610° C. (kPa) | Co-Ferrite magnetic powder Hc (Oe) |
|---|---|---|
| Example 2-1 | 21.0 | 1100 |
| Example 2-2 | 10.0 | 1100 |
| Example 2-3 | 5.0 | 1550 |
| Example 2-4 | 3.0 | 2030 |
| Example 2-5 | 1.0 | 2520 |
| Example 2-6 | 0.5 | 2830 |
| Example 1 | 0.1 | 3010 |

Table 1 indicates the following. The coercive force Hc can be improved by setting the oxygen partial pressure during the heat treatment in the crystallization step to less than 10.0. In a case where the oxygen partial pressure is set to 1.0 kPa or less, a coercive force Hc of 2500 Oe or more desired in a high density magnetic recording medium can be achieved.

(Magnetic Characteristics after Magnetic Tape is Formed)

Using the magnetic powder of Example 2-6, an application type magnetic tape having a base layer and a recording layer was manufactured. Note that for forming a magnetic tape, a magnetic field of 5 k Oe was applied in a perpendicular direction (thickness direction) of a film (nonmagnetic support) after a recording layer forming coating material was applied and before the recording layer forming coating material was dried, and the recording layer forming coating material was dried in the magnetic field. When magnetic characteristics were measured in a perpendicular direction and a longitudinal direction of this magnetic tape, the following results were obtained.

(Magnetic Characteristics in Perpendicular Direction)

Coercive force Hc: 3200 Oe

Squareness ratio SR: 0.70

(Magnetic Characteristics in Longitudinal Direction)

Coercive force Hc: 2200 Oe

Squareness ratio SR: 0.25

As described above, large anisotropy with squareness ratios different by two times or more in the applied magnetic field directions was confirmed, and therefore uniaxial anisotropy was confirmed.

(Angle Dependence of Torque)

In order to confirm uniaxial anisotropy, angle dependence of a torque applied to the magnetic tape when a magnetic field was applied was further measured using a torque meter as follows. First, using the magnetic powder of Example 2-6, an application type magnetic tape having a base layer and a recording layer was manufactured. Note that for forming a magnetic tape, a magnetic field of 5 k Oe was applied in a longitudinal direction of a film (nonmagnetic support) after a recording layer forming coating material was applied and before the recording layer forming coating material was dried, and the recording layer forming coating material was dried in the magnetic field. Next, when this magnetic tape was disposed in a torque meter and a torque fluctuation due to an angle was measured, a torque fluctuation with a period of 180° was confirmed, and uniaxial anisotropy was confirmed.

Hereinabove, the embodiments of the present disclosure and Examples thereof have been described specifically. However, the present disclosure is not limited to the above-described embodiments and Examples, but various modifications based on the technical idea of the present disclosure can be made.

For example, the configurations, the methods, the steps, the shapes, the materials, the numerical values, and the like exemplified in the above-described embodiments and Examples are only examples, and a configuration, a method, a step, a shape, a material, a numerical value, and the like different therefrom may be used as necessary. Furthermore, the chemical formulas of the compounds and the like are representative and are not limited to the described valences and the like as long as the compounds have common names of the same compound.

Furthermore, the configurations, the methods, the steps, the shapes, the materials, the numerical values, and the like in the above-described embodiments and Examples can be combined to each other as long as not departing from the gist of the present disclosure.

Furthermore, the present disclosure can adopt the following configurations.

(1)

A method for manufacturing a magnetic powder, including:

melting and then quenching a glass-forming component and a spinel ferrite magnetic powder-forming component to manufacture an amorphous body; and heat-treating the amorphous body to precipitate a spinel ferrite magnetic powder, in which an oxygen partial pressure during the heat treatment is 1.0 kPa or less.

(2)

The method for manufacturing a magnetic powder according to (1), in which the glass-forming component contains sodium borate.

(3)

The method for manufacturing a magnetic powder according to (2), in which the glass-forming component further contains at least one of an alkaline earth metal oxide and a precursor of the oxide.

(4)

The method for manufacturing a magnetic powder according to (3), in which the alkaline earth metal oxide contains at least one of calcium oxide, strontium oxide, and barium oxide.

(5)

The method for manufacturing a magnetic powder according to (3), in which the alkaline earth metal oxide contains at least one of strontium oxide and barium oxide.

(6)

The method for manufacturing a magnetic powder according to any one of (2) to (5), in which the ratio of the sodium borate to the total amount of the glass-forming component and the spinel ferrite magnetic powder-forming component is 35 mol % or more and 60 mol % or less.

(7)

The method for manufacturing a magnetic powder according to any one of (1) to (6), in which the spinel ferrite magnetic powder-forming component contains at least one of cobalt oxide and a precursor of the cobalt oxide, and iron oxide (8)

The method for manufacturing a magnetic powder according to any one of (1) to (7), in which the spinel ferrite magnetic powder is a cobalt ferrite magnetic powder.

(9)

The method for manufacturing a magnetic powder according to any one of (1) to (8), in which the spinel ferrite magnetic powder has a coercive force Hc of 2500 Oe or more.

(10)

The method for manufacturing a magnetic powder according to any one of (1) to (9), in which an oxygen partial pressure during the heat treatment is 0.9 kPa or less.

(11)

The method for manufacturing a magnetic powder according to any one of (1) to (10), in which the spinel ferrite magnetic powder has an average particle size of 25 nm or less.

(12)

A spinel ferrite magnetic powder having uniaxial anisotropy, an average particle size of 25 nm or less, and a coercive force Hc of 2500 Oe or more.

(13)

A magnetic powder manufacturing method for manufacturing a spinel ferrite magnetic powder by a glass crystallization method using a glass-forming component containing sodium borate and a spinel ferrite magnetic powder-forming component.

REFERENCE SIGNS LIST

11 Substrate
12 Base layer
13 Recording layer
14 Back coat layer

The invention claimed is:

1. A method for manufacturing a magnetic powder, comprising:
   melting and then quenching a glass-forming component and a spinel ferrite magnetic powder-forming component to manufacture an amorphous body; and
   heat-treating the amorphous body to precipitate a spinel ferrite magnetic powder, wherein
   an oxygen partial pressure during the heat treatment is 1.0 kPa or less.

2. The method for manufacturing a magnetic powder according to claim 1, wherein the glass-forming component contains sodium borate.

3. The method for manufacturing a magnetic powder according to claim 2, wherein the glass-forming component further contains at least one of an alkaline earth metal oxide and a precursor of the oxide.

4. The method for manufacturing a magnetic powder according to claim 3, wherein the alkaline earth metal oxide contains at least one of calcium oxide, strontium oxide, and barium oxide.

5. The method for manufacturing a magnetic powder according to claim 3, wherein the alkaline earth metal oxide contains at least one of strontium oxide and barium oxide.

6. The method for manufacturing a magnetic powder according to claim 2, wherein a ratio of the sodium borate to a total amount of the glass-forming component and the spinel ferrite magnetic powder-forming component is 35 mol % or more and 60 mol % or less.

7. The method for manufacturing a magnetic powder according to claim 1, wherein the spinel ferrite magnetic powder-forming component contains at least one of cobalt oxide and a precursor of the cobalt oxide, and iron oxide.

8. The method for manufacturing a magnetic powder according to claim 1, wherein the spinel ferrite magnetic powder is a cobalt ferrite magnetic powder.

9. The method for manufacturing a magnetic powder according to claim 1, wherein the spinel ferrite magnetic powder has a coercive force Hc of 2500 Oe or more.

10. The method for manufacturing a magnetic powder according to claim 1, wherein an oxygen partial pressure during the heat treatment is 0.9 kPa or less.

11. The method for manufacturing a magnetic powder according to claim 1, wherein the spinel ferrite magnetic powder has an average particle size of 25 nm or less.

12. A magnetic powder manufacturing method for manufacturing a spinel ferrite magnetic powder by a glass crystallization method using a glass-forming component containing sodium borate and a spinel ferrite magnetic powder-forming component.

* * * * *